United States Patent
Lee et al.

(10) Patent No.: US 9,456,165 B2
(45) Date of Patent: Sep. 27, 2016

(54) DISPLAY APPARATUS AND DISPLAY METHOD

(71) Applicant: SAMSUNG ELECTRONICS CO., LTD., Suwon-si (KR)

(72) Inventors: Jung-won Lee, Ansan-si (KR); Young-woong Kim, Suwon-si (KR); Kwang-sun Baek, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/885,565

(22) Filed: Oct. 16, 2015

(65) Prior Publication Data

US 2016/0112669 A1   Apr. 21, 2016

(30) Foreign Application Priority Data

Oct. 16, 2014   (KR) ........................ 10-2014-0140029

(51) Int. Cl.
  *H04N 5/445*  (2011.01)
  *H04N 5/50*   (2006.01)
(52) U.S. Cl.
  CPC ...... *H04N 5/44504* (2013.01); *H04N 5/44543* (2013.01); *H04N 5/44591* (2013.01); *H04N 5/50* (2013.01)

(58) Field of Classification Search
  CPC ..................... H04N 5/44504; H04N 5/44543; H04N 5/44591; H04N 5/50; H04N 5/265; H04N 5/45; H04N 5/445; H04N 9/75; H04N 9/74
  USPC ......... 348/569, 563–567, 591–599; 345/629, 345/634, 641
  IPC ................... H04N 5/445, 5/45, 5/50, 9/74, 9/75
  See application file for complete search history.

(56) References Cited

U.S. PATENT DOCUMENTS 8,280,115 B2 * 10/2012 Matsumura ........... G06T 7/0075
  345/634
2014/0184912 A1 * 7/2014 Omprakash ............ G09G 5/003
  348/564

\* cited by examiner

*Primary Examiner* — Sherrie Hsia
(74) *Attorney, Agent, or Firm* — Staas & Halsey LLP

(57) ABSTRACT

The display apparatus includes a receiver configured to receive a first image set, a storage configured to store a second image set with a size corresponding to the first image set, an image processor configured to receive the first image set and the second image set in units of frames and to synthesize the first image set and the second image set to generate a final image set, and a display configured to display the final image set. The image processor detects a region of the second image set, to be synthesized with the first image set, receives only partial data corresponding to the detected region with respect to the second image set of a next frame after the region is detected, and synthesizes the some received data and the first image set to generate a final image set.

14 Claims, 15 Drawing Sheets

DISPLAY APPARATUS AND DISPLAY METHOD

CROSS-REFERENCE TO RELATED APPLICATIONS

This application claims priority from Korean Patent Application No.10-2014-0140029, filed on Oct. 16, 2014, in the Korean Intellectual Property Office, the disclosure of which is incorporated herein by reference in its entirety.

BACKGROUND

1. Field

Apparatuses and methods consistent with the present disclosure relate to a display apparatus and a display method, and more particularly, to a display apparatus and a display method, for reading only data to be displayed on a display to enhance processing speed.

2. Description of Related Art

A display apparatus displays an image signal provided from an external source. In order to provide information of an operation status of the display apparatus and receive a user command for control of the operation status, the display apparatus frequently displays an on-screen display (OSD) image together with a broadcast signal received from an external source.

In detail, a display apparatus synthesizes and displays an OSD image and a broadcast signal received from an external source. In this regard, conventionally, an OSD image with an image size corresponding to a broadcast signal is transmitted to and processed by an image processor.

However, there is a problem of generating load with respect to an operation of a display apparatus in that data transmitted for actual data processing corresponding to an entire screen size although an OSD image occupies only a partial image of a screen. In particular, increase in the aforementioned load becomes more serious in that a synthesis operation of a display is performed on a frame basis and the aforementioned image transmission is repeated on a frame basis.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a display apparatus and a display method, for reading only data to be displayed on a display to enhance processing speed.

According to an aspect of the present disclosure, a display apparatus includes a receiver configured to receive a first image set, a storage configured to store a second image set with a size corresponding to the first image set, an image processor configured to receive the first image set and the second image set in units of frames and to synthesize the first image set and the second image set to generate a final image set, and a display configured to display the final image set, wherein the image processor, in response to an entire portion of the second image set being received, detects a region of the second image set, to be synthesized with the first image set, receives only some data (partial data) corresponding to the detected region with respect to the second image set stored in the storage from a next frame after the region is detected, and synthesizes the some received data and the first image set to generate a final image set.

The second image set may contain transparency information about each pixel of the second image set, and the image processor may detect the region of the second image set, to be synthesized with the first image set, using the transparency information.

The display apparatus may further include a second storage configured to store positional information about the detected region, wherein the image processor may receive only some data corresponding to the detected region with respect to the second image set stored in the storage, based on the positional information stored in the second storage.

The positional information may include positional information about a synthesis region on the second image set and address information about some data corresponding to the synthesis region of the second image set.

The image processor may store the positional information about the synthesis region on the second image set in at least one of pixel units, block units, horizontal line units, vertical line units, and entire image units in the second storage, and some data corresponding to the detected region may be received in the storing unit.

The second image set is an on-screen display (OSD) image.

The receiver and the image processor may be embodied as a system on chip (SoC).

According to another aspect of the present disclosure, a display method includes receiving a first image set, storing a second image set with a size corresponding to the first image set, receiving the first image set and the second image set in units of frames, in response to an entire portion of the second image being received, detecting a region of the second image set, to be synthesized with the first image set, receiving only some data corresponding to the detected region with respect to the second image set stored in the storage from a next frame after the region is detected, synthesizing the some received data and the first image set to generate a final image set, and displaying the generated last image set.

The second image set may contain transparency information about each pixel of the second image set, and the detecting may include detecting the region of the second image set, to be synthesized with the first image set, using the transparency information.

The display method may further include storing positional information about the detected region, wherein the receiving of only some data includes receiving only some data corresponding to the detected region with respect to the second image set stored in the storage, based on the stored positional information.

The positional information may include positional information about a synthesis region on the second image set and address information about some data corresponding to the synthesis region of the second image set.

The storing of the positional information may include storing the positional information about the synthesis region on the second image set in at least one of pixel units, block units, horizontal line units, vertical line units, and entire image units, and the receiving of the only some data may include receiving some data corresponding to the detected region received in the storing unit.

The second image set may be an on-screen display (OSD) image.

According to another aspect of the present disclosure, a non-transitory computer readable medium has a program for execution of a display method includes receiving a first image set, storing a second image set with a size corresponding to the first image set, receiving the first image set and the second image set in units of frames, in response to an entire portion of the second image being received, detecting a region of the second image set, to be synthesized with the first image set, receiving only some data corresponding to the detected region with respect to the second image set stored in the storage from a next frame after the region is detected, synthesizing the some received data and the first image set to generate a final image set, and displaying the generated last image set.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DESCRIPTION OF EMBODIMENTS

Figure 1:
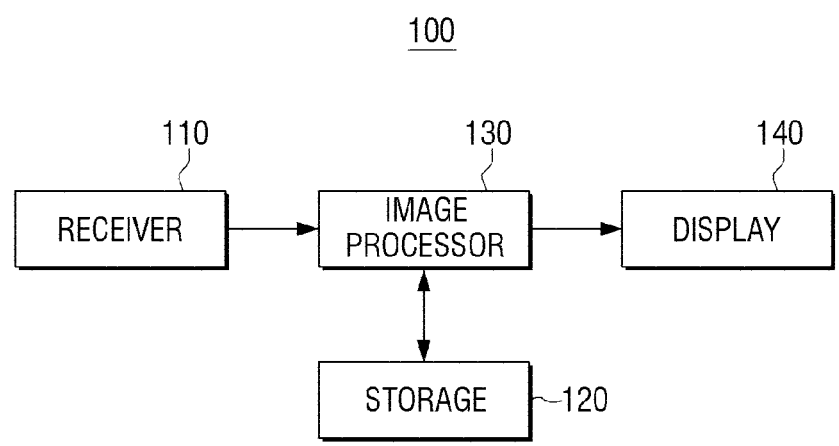
FIG. 1 is a block diagram illustrating a configuration of a display apparatus according to an exemplary embodiment of the present disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others. The phrase "at least one of," when followed by a list of two or more items, is an alternative expression denoting a selection of one or more items from the list.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

The present disclosure will now be described more fully with reference to the accompanying drawings, in which exemplary embodiments of the disclosure are shown.

FIG. 1 is a block diagram illustrating a configuration of a display apparatus 100 according to an exemplary embodiment of the present disclosure.

Referring to FIG. 1, the display apparatus 100 includes a receiver 110, a storage 120, an image processor 130, and a display 140. The display apparatus 100 may provide an image or image/voice information to a user and may be, for example, a monitor, a digital television (TV), or the like.

The receiver 110 receives a first image set. In detail, the receiver 110 may receive an image from an external image providing apparatus (e.g., a set-top box). Here, the image may be a broadcast signal that is transmitted from a broadcasting station or a satellite by wire or wirelessly and may be image content transmitted from a DVD player, a blu-ray player, or the like through a high definition multimedia interface (HDMI) cable, audio video (AV) terminal, or the like.

The storage 120 stores a second image set with a size corresponding to the first image set. Here, the second image set may overlap with the first image set, may be displayed on the display 140, and may include an OSD menu, channel information, volume information, a setting menu, or the like.

The second image set may be displayed to overlap with the first image set and may have a size corresponding to the first image set. In detail, the second image set may be formed to contain a region that is not applied to the first image set as well as a region of the second image set, which is applied to the first image set.

In addition, the storage 120 may form and store the second image set for each pixel as a database. In detail, the second image set may form and store RGB values and transparency for each pixel as a database.

Here, the transparency may refer to a transmission degree of a transmission image and may be represented by a parameter α (alpha) indicating transparency. In detail, the parameter α (alpha) has a value between 0 and 255. In this regard, as the value is increased, a transmission degree of a corresponding pixel is reduced, and as the value is reduced, a transmission degree of the corresponding pixel is increased. When the parameter α (alpha) is 0, a transmission degree is 100% such that the second image set is not applied to the first image set. For example, the storage 120 may form and store RGB values 144, 157, and 172 and α (0) as a database with respect to a predetermined pixel, and since α (alpha) of the pixel is 0, a region of the second image set corresponding to the pixel is not applied to the first image set and does not affect a final image.

In addition, the storage 120 may store a plurality of second image sets. For example, an image for channel information and an image for volume information may be stored in one storage 120. In this case, the respective images may be stored in storage spaces with different addresses.

The image processor 130 receives the first image set and the second image set on a frame basis and synthesizes the received first image set and second image set to generate a final image set. In detail, the image processor 130 may receive the first image set from the receiver 110 on a frame basis, receive the second image set from the storage 120 on a frame basis to generate a final image set, and display the final image set on the display 140.

For example, the image processor 130 may receive an image corresponding to the first image set of the first image set from the receiver 110 and request and receive the second image set from the storage 120. In addition, the image processor 130 may synthesize the first image set and the second image set to generate a final image set of a first frame. The generated image may be displayed by the display 140.

In addition, the image processor 130 may receive an image of a second frame of the first image set from the receiver 110 and request and receive the second image set to and from the storage 120. In addition, the image processor 130 may synthesize the first image set and the second image set to generate a final image set of the second frame. An image generated during this process may be displayed by the display 140.

In addition, in response to an initial second image set being received, the image processor 130 detects a region to be synthesized with the first image set from the received second image set.

In detail, the image processor 130 may request the storage 120 for the second image set and receive data about the second image set. When the initial second image set is received, that is, when a final image set of the first frame is generated, image data corresponding to all areas of the second image set may be received from the storage 120. Upon receiving data of the second image set formed by forming and storing RGB values and α (alpha) for each pixel as a database, the image processor 130 may check α (alpha) to check whether a corresponding pixel is to be applied to the first image set.

In more detail, when α (alpha) is 0, a transmission degree of the second image set is 100%, and thus the second image set is not applied to the first image set. However, when α (alpha) is a value between 1 and 255, a transmission degree of the second image set is not 100%, and thus the second image set is applied to the first image set. Accordingly, when a predetermined pixel has RGB values 144, 157, and 172 and α (0), the image processor 130 may determine that the pixel is not applied to the first image set. When a predetermined pixel has RGB values 162, 95, and 188 and α (30), the pixel is applied to the first image set, and thus the image processor 130 may detect a region of the second image set corresponding to the pixel as a region synthesized with the first image set.

In addition, the image processor 130 receives only some data corresponding to a detected area of the second image set stored in a storage from a next frame after the region is detected.

In detail, during a process for generating a final image set of the first frame, image data of an entire area of the second image set is received, whereas only image data of a region to be synthesized with the first image set is received for generating an image of the second frame.

In more detail, during a process for generating a final image set of the first frame, upon detecting a region to be synthesized with the first image set, the image processor 130 may request and receive some data corresponding to a detected area of the second image set to and from the storage 120.

For example, α (alpha) of pixel (5, 5), pixel (5, 6), pixel (5, 7), pixel (5, 8), pixel (5, 9), pixel (5, 10), pixel (6, 5), pixel (6, 6), pixel (6, 7), pixel (6, 8), pixel (6, 9), and pixel (6, 10) is not 0, and thus the image processor 130 may request and receive image of the above pixels to and from the storage 120 when a region of the second image set corresponding to the above pixels is synthesized with the first image set. However, when α (alpha) of other pixels except for the above pixels is 0 and is not applied to the first image set, the image processor 130 does not request image data about the other pixels to the storage 120.

In addition, the image processor 130 synthesizes the received some data and the first image set to generate a final image set. In detail, image data corresponding to a region that is applied to the first image set is received from the storage 120. That is, image data about the region applied to the first image set is in a status with information about RGB values and α (alpha) for each pixel. Accordingly, the image processor 130 may generate final image set further using information about α (0) with respect to the region that is not synthesized with the first image set, that is, a region with 0 as α (alpha).

In more detail, the image processor 130 may synthesize the received data of the second image set and the first image set with respect to the region of the second image set, to be synthesized with the first image set and reflect 0 as α (alpha) to the region of the second image set, which is not synthesized with the first image set so as to output only the first image set.

In addition, the image processor 130 may store positional information of the region of the second image set, to be synthesized with the first image set in a second storage (not shown) and receive only some data corresponding to the region detected with respect to the second image set that is stored in the storage based on the stored positional information.

For example, the image processor 130 may store positional information of pixels corresponding to the region of the second image set, to be synthesized with the first image set in a second storage (not shown). In this case, the positional information of a pixel may be stored in the form of pixel (x,y). That is, when a pixel of a display is 1,024*768, x may have a value of 1 to 1,024, and y may have a value of 1 to 768.

The image processor 130 may receive only some data corresponding to the detected area with respect to the second image set stored in the storage based on the positional information stored in the second storage.

The image processor 130 may store address information of the storage 120 with respect to some data corresponding to the synthesized area of the second image set in a second storage (not shown).

In detail, the storage 120 may store a plurality of second image sets and in this case, the respective images may be stored in storage spaces with different addresses. In this case, the image processor 130 may store an address of the currently synthesized second image set of the address of the storage spaces that store the respective images as positional information in a second storage (not shown).

In addition, when one of a plurality of second image sets is stored in a third storage (not shown) and a currently synthesized image is the image stored in the third storage (not shown), the image processor 130 may store an address of the third storage as positional information in a second storage (not shown).

In this manner, the image processor 130 may store address information of the storage 120 with respect to some data of the second image set, corresponding to the synthesized area of the second image set, in a second storage (not shown).

In addition, the image processor 130 may store the positional information of the synthesized area of the second image set in at least one of pixel units, block units, horizontal line units, vertical line units, and entire image units in the second storage (not shown) and receive some data corresponding to the detected area in the stored units.

In detail, the image processor 130 may bind a preset number of pixels in units of blocks and store positional information of a block containing a region of the second image set, to be synthesized with the first image set, in a second storage (not shown).

The image processor 130 may bind pixels of the same horizontal line and store positional information about the horizontal line containing the region of the second image set, to be synthesized with the first image set, in a second storage (not shown).

The image processor 130 may bind pixels of the same vertical line and store positional information about the vertical line containing the region of the second image set, to be synthesized with the first image set, in a second storage (not shown).

The image processor 130 may bind all pixels and store positional information of an entire screen corresponding to the region of the second image set, to be synthesized with the first image set, in a second storage (not shown).

Upon requesting and receiving image to and from the storage 120, the image processor 130 may request and receive data of the second image set for each stored unit. A detailed method will be described in more detail with reference to FIGS. 6A to 6D.

In addition, when a preset event occurs, the image processor 130 may determine that an image of the second image set is changed. In detail, the display apparatus 100 may include a generator (not shown) for generating the second image set. When the second image set stored in a first address of the storage 120 is synthesized as a final image set and the generator (not shown) transmits a new second image set with the first address of the storage 120, the image processor 130 may check a transmission procedure of the image and determine that the image of the second image set is changed.

When the image of the second image set is changed, the image processor 130 may synthesize the changed second image set. In detail, when the image of the second image set is changed, the aforementioned all processes may be performed on the changed image, the first image set and the changed image of the second image set may be synthesized to generate a final image set, and the final image set may be displayed on the display 140.

For example, the image processor 130 may receive the first image set and the changed second image set on a frame basis and synthesize the received first image set and changed second image set to generate a final image set.

Upon receiving the changed second image set, the image processor 130 may detect a region of the received second image set, to be synthesized with the first image set.

The image processor 130 may receive only some data corresponding to the detected area of the second image set stored in the storage from a next frame after the region is detected.

In addition, the image processor 130 may synthesize the received data and the first image set to generate a final image set. In addition, a controller (not shown) may determine to change the second image set that is currently displayed. In this case, the image processor 130 may receive a signal indicating the second image set is changed from the controller (not shown) and determine that the second image set is changed.

The controller (not shown) may change the address of the second image set, to be received by the image processor 130. In this case, the image processor 130 may detect that the stored address of the received second image set is changed to determine that the second image set is changed.

The display 140 may display the generated final image set. In detail, the final image set obtained by synthesizing the first image set and the second image set. The display 140 may be an image display apparatus such as LCD, PDP, and CRT.

The receiver 110 and the image processor 130 may be embodied in the form of a single chip. Accordingly, the display apparatus 100 may be embodied in system on chip (SoC).

As described above, the display apparatus 100 according to the exemplary embodiment of the present disclosure may receive only image data of all image data, to be displayed, without receiving all image data during synthesis of image data, thereby reducing unnecessary data transmission between the storage 120 and the image processor 130. In addition, data transmission between the storage 120 and the image processor 130 may be reduced, thereby saving a bandwidth and reducing power consumption.

In the exemplary embodiment of the present disclosure, although the case in which image data corresponding to an entire area of the second image set is received to generate an image of a first frame has been described, embodiments of the present disclosure are not limited thereto. That is, alternatively, image data corresponding to an entire area of the second image set is received, and then only image data of a region to be applied to the first image set is received from an image of one frame to generate a final image set.

Figure 2A:
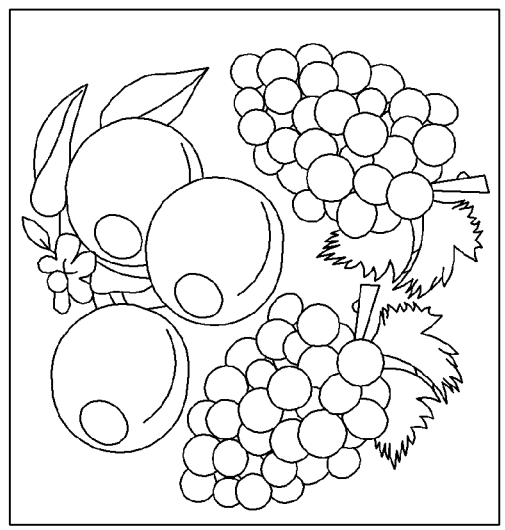
FIGS. 2A to 2C are diagrams illustrating a first image set, a second image set, and a final image set according to an exemplary embodiment of the present disclosure.
Figure 2B:
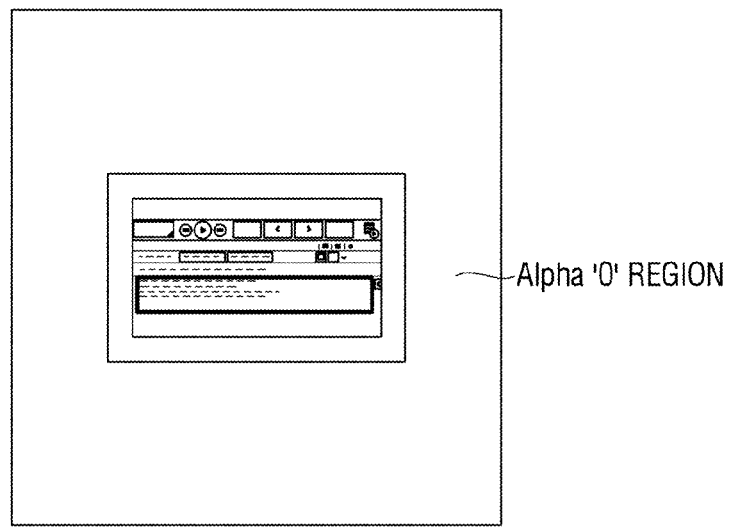
Figure 2C:
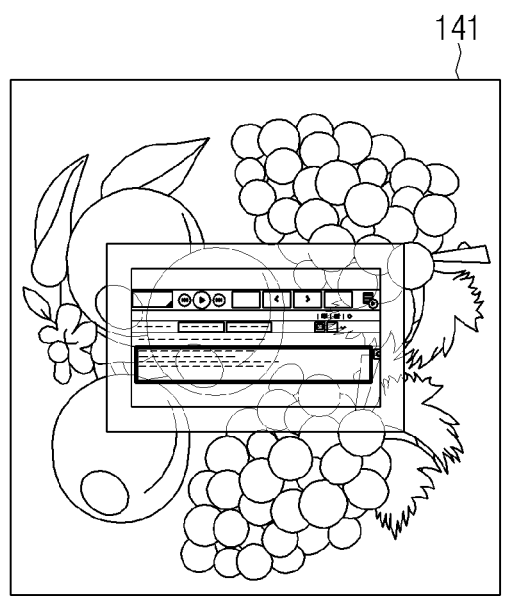

FIGS. 2A to 2C are diagrams illustrating a first image set, a second image set, and a final image set according to an exemplary embodiment of the present disclosure.

FIG. 2A is a diagram illustrating the case in which the first image set received by the receiver 110 is displayed without synthesis with the second image set.

FIG. 2B is a diagram illustrating the second image set to be synthesized with the first image set. Here, an internal area of a menu window has a value between 1 and 255 as α (alpha) of each pixel, and an external area of the menu window has 0 as α (alpha) of each pixel.

FIG. 2C is a diagram illustrating the case in which a final image set obtained by synthesizing the first image set and the second is displayed through a screen 141 of a display.

Here, an internal area of a menu window has a value between 1 and 255 as α (alpha) of each pixel, and it may be seen that the second image set is displayed to overlap on the first image set.

However, an external area of the menu window has 0 as α (alpha) of each pixel, and it may be seen that the second image set is not applied to the first image set.

That is, upon receiving an initial second image set, the image processor 130 detects a region of the received second image set, to be synthesized with the first image set, and receives image data of all pixels of the second image set from the storage 120 during a process of generating a final image set of the first frame.

In this case, upon receiving the second image set stored and formed by forming RGB values and α (alpha) for each pixel as a database from the storage 120, the image processor 130 may check α (alpha) to check whether a corresponding pixel is applied to the first image set. For example, when a predetermined pixel has RGB values 144, 157, and 172 and α (0), it may be determined that the pixel is not synthesized with the first image set.

When a predetermined pixel has RGB values 162, 95, and 188 and α (30), the pixel is synthesized with the first image set, and the region of the second image set, corresponding to the pixel, may be detected as a region synthesized with the first image set.

Upon completing detection, the image processor 130 may receive only data of the second image set, corresponding to the detected area of the second image set stored in a storage, during a process of generating a final image set of a next frame.

Figure 3:
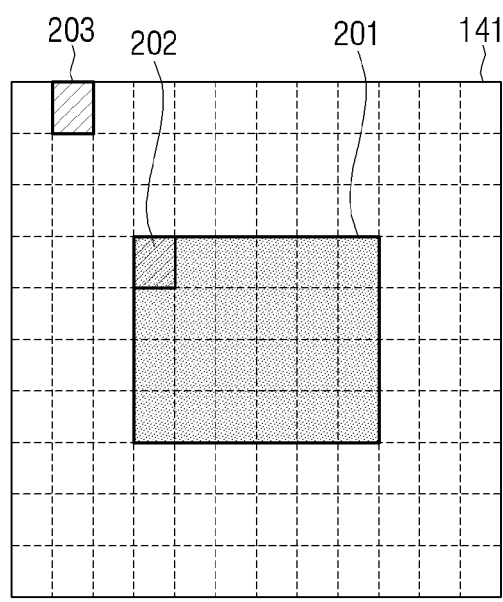
FIGS. 3 to 6 are diagrams for explanation of an operation of an image processor of FIG. 1.

FIG. 3 is a diagram for explanation of an operation of the image processor 130 of FIG. 1 according to an exemplary embodiment of the present disclosure.

Referring to FIG. 3, the image processor 130 may store positional information of each pixel in the form of pixel (x, y) in a second storage (not shown). That is, in the case of a pixel 202 with 4 as an X-axis value and 4 as a Y-axis value, positional information may be stored in the form of pixel (4, 4). In addition, in the case of a pixel 203 with 2 as an X-axis value and 1 as a Y-axis value, positional information may be stored in the form of pixel (2, 1).

The image processor 130 may request and receive only data corresponding to a position of a stored pixel among data of the second image set stored in the storage 120, based on the stored positional information of the pixel.

In the exemplary embodiment of the present disclosure, for convenience of description, although the case in which a screen 141 of a display has a pixel of 12*10 has been described, exemplary embodiments of the present disclosure are not limited thereto. For example, when a pixel of the display is 1,024*768, an x value has 1 to 1,024 and a y value has 1 to 768.

Figure 4:
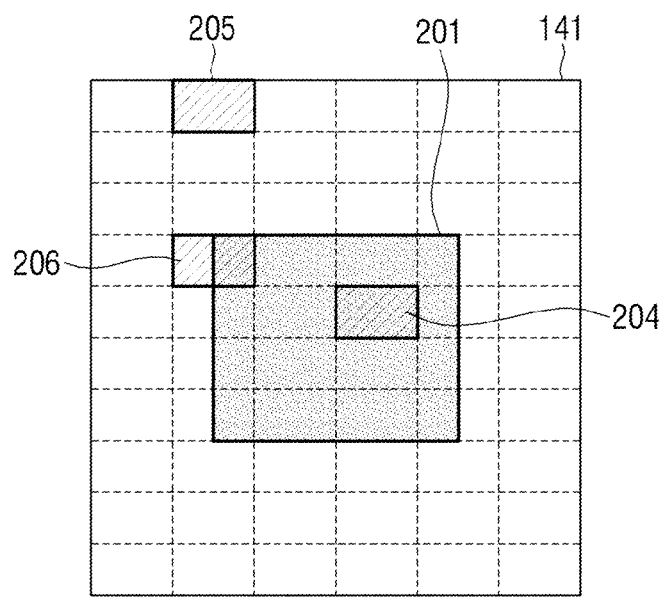

FIG. 4 is a diagram for explanation of an operation of the image processor 130 of FIG. 1 according to an exemplary embodiment of the present disclosure.

Referring to FIG. 4, the image processor 130 may store positional information of a region in which the second image set is applied to the first image set, in units of blocks containing a plurality of pixels. Each block 204, 205, or 206 may be one block containing a preset number of pixels.

The image processor 130 needs to receive image data corresponding to a block 204 contained in a region 201 in which the second image set is synthesized with the first image set in order to synthesize a final image set. Accordingly, the image processor 130 may store positional information about a block 204 in the form of block (4, 5) in a second storage (not shown) and request and receive image data about pixels of a position corresponding to the block (4, 5) to and from the storage 120.

In addition, upon receiving image data of the second image set of pixels of a position corresponding to the block (4, 5), the image processor 130 may synthesize the image data with the first image set using the image data.

A block 205 is not contained in the region 201 in which the second image set is synthesized with the first image set (that is, an alpha value is 0). Accordingly, the block 205 does not necessarily receive image data in order to synthesize a final image set. In this case, the image processor 130 does not necessarily request image data about the block 205 to the storage 120. Accordingly, upon synthesizing a final image set, the image processor 130 may not apply a region of the second image set, corresponding to the block 205, to the first image set using information indicating that an alpha value of the block 205 is 0 to synthesize a final image set.

A partial region of a block 206 is the region 201 in which the second image set is synthesized with the first image set and another partial region is a region in which the second image set is not synthesized with the first image set. In this case, since the block 206 contains the region 201 in which the second image set is synthesized with the first image set, image data about a region corresponding to the block needs to be received in order to synthesize a final image set. Accordingly, the image processor 130 may store positional information of the block 206 in the form of block (2, 4) in a second storage (not shown) and request and receive image data about pixels with positions corresponding to the positional information to and from the storage 120.

In addition, upon receiving image data of the second image set with respect to the pixels with the positions corresponding to the block (2, 4) from the storage 120, the image processor 130 may synthesize the first image set and the second image set using the image data.

Figure 5:
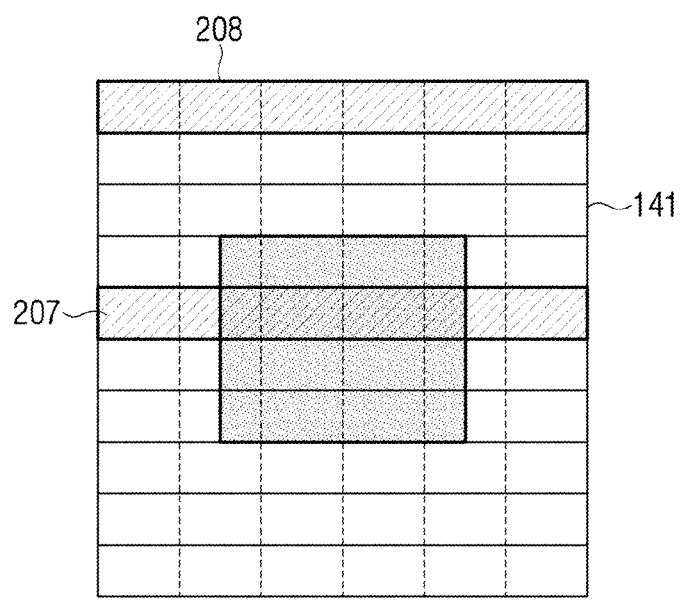

FIG. 5 is a diagram for explanation of an operation of the image processor 130 of FIG.

Referring to FIG. 5, the image processor 130 may detect positional information of a region of the second image set, to be synthesized with the first image set, as a horizontal line unit containing a plurality of pixels and may store the positional information in a second storage (not shown).

In detail, each of horizontal lines 207 and 208 may include all pixels of the corresponding horizontal lines. The horizontal line 207 containing the region 201 in which the second image set is synthesized with the first image set needs to receive image data in order to synthesize a final image set.

Accordingly, the image processor 130 may store positional information of the horizontal line 207 in the form of horizontal line 5 in a second storage 150 and request and receive image data of pixels with positions corresponding to the positional information to and from the storage 120.

Upon receiving image data of the second image set with respect to pixels with positions corresponding to the horizontal line 5, the image processor 130 may synthesize the second image set with the first image set using the image data.

The horizontal line 208 is not contained in the region 201 in which the second image set is synthesized with the first image set (that is, an alpha value is 0), and thus a portion of the horizontal line 208 does not necessarily receive image data in order to synthesize a final image set.

In this case, the image processor 130 does not necessarily request image data about the portion of the horizontal line 208 to the storage 120. Accordingly, upon synthesizing the final image set, the image processor 130 may synthesize the final image set without applying a region of the second image set, corresponding to the horizontal line 208, to the first image set using only information indicating that an alpha value of the horizontal line 208 is 0.

Figure 6:
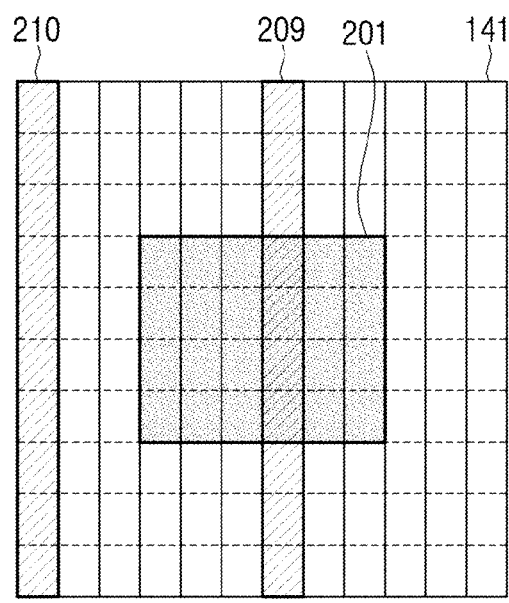

FIG. 6 is a diagram for explanation of an operation of the image processor 130 of FIG. 1.

Referring to FIG. 6, the image processor 130 may detect positional information of a region of the second image set, to be synthesized with the first image set, as a vertical line unit containing a plurality of pixels and may store the positional information in a second storage (not shown).

In detail, each of vertical lines 209 and 210 may include all pixels of the corresponding vertical line. The vertical line 209 containing the region 201 in which the second image set is applied to the first image set needs to receive image data in order to synthesize a final image set.

Accordingly, the image processor 130 may store positional information of the vertical line 209 in the form of vertical line 7 in the second storage 150 and request and receive image data of pixels with positions corresponding to the positional information to and from the storage 120.

Upon receiving image data of the second image set with respect to pixels with positions corresponding to the vertical line 7, the image processor 130 may synthesize the second image set with the first image set using the image data.

The vertical line 210 is not contained in the region 201 in which the second image set is synthesized with the first image set (that is, an alpha value is 0), and thus a portion of the vertical line 210 does not necessarily receive image data in order to synthesize a final image set.

In this case, the image processor 130 does not necessarily request image data about the portion of the vertical line 210 to the storage 120. Accordingly, upon synthesizing the final image set, the image processor 130 may synthesize the final image set without applying a region of the second image set, corresponding to the vertical line 210, to the first image set using only information indicating that an alpha value of the vertical line 210 is 0.

Although not illustrated, positional information of a region in which the second image set is to be synthesized with the first image set may be stored in units of an entire screen containing a plurality of pixels. With regard to some image synthesis technologies, when all regions of an overlay image is not applied to an original image, that is, when an alpha value of all pixels of the overlay image is 0, data about the overlay image may be received from a storage to synthesize an image. In this case, when the exemplary embodiment of the present disclosure is used, when an alpha value of all pixels of the overlay image is 0, data of the second image set is not necessarily received.

Figure 7:
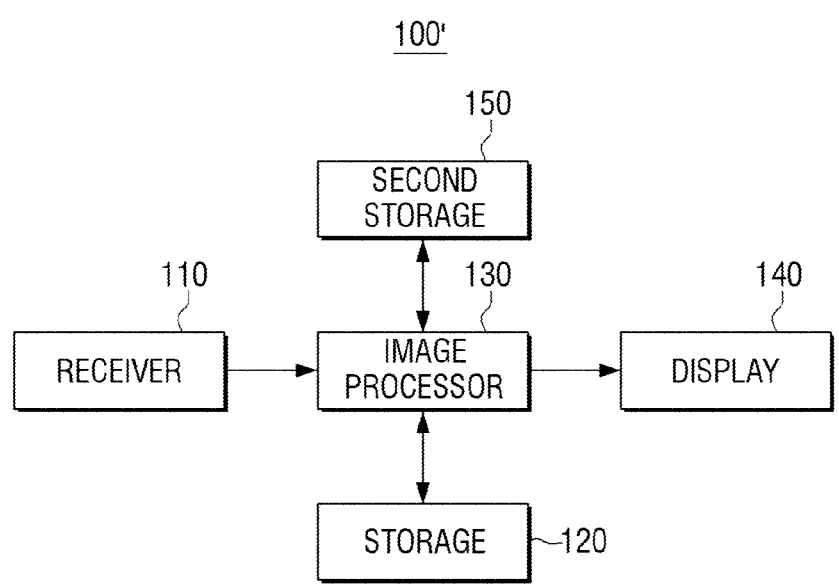
FIG. 7 is a block diagram illustrating a configuration of a display apparatus according to another exemplary embodiment of the present disclosure.

FIG. 7 is a block diagram illustrating a configuration of the display apparatus 100 according to another exemplary embodiment of the present disclosure.

As seen from FIG. 7, the display apparatus 100 further include the second storage 150.

The second storage 150 may store positional information of a synthesis region of the second image set on the first image set. For example, the second storage 150 may store positional information of pixels corresponding to a region of the second image set, to be synthesized with the first image set, in the form of pixel (x,y). That is, when a pixel of a display is 1,024*768, x may have a value of 1 to 1,024, and y may have a value of 1 to 768.

The second storage 150 may store address information of some data corresponding to the synthesis region of the second image set.

In detail, the second storage 150 may store positional information about an address for storing the second image set. For example, the storage 120 may store a plurality of second image sets, and in this case, respective images may be stored in storage spaces with different addresses. In this case, the second storage 150 may store the address of the currently synthesized second image set among addresses of the storage spaces in which the respective images are stored, as positional information. In this manner, the second storage 150 may store address information (a first address and a second address of the second storage) of a storage with respect to some data corresponding to the synthesis of the second image set.

When one of a plurality of images is stored in a third storage (not shown) and a currently synthesized image is stored in the third storage (not shown), the second storage 150 may store an address of the third storage as positional information. In this manner, the second storage 150 may store address information (a second storage and a third storage) of some data corresponding to the synthesis region of the second image set.

In addition, the second storage 150 may store positional information of a region of the second image set, to be synthesized with the first image set, in at least one of pixel units, block units, horizontal line units, vertical line units, and entire image units.

In detail, the second storage 150 may store positional information of each pixel corresponding to a region of the second image set, to be synthesized with the second image set.

The second storage 150 may store positional information of each block corresponding to a region of the second image set, to be synthesized with the first image set.

The second storage 150 may store positional information of each horizontal line corresponding to a region of the second image set, to be synthesized with the first image set.

The second storage 150 may store positional information of each vertical line corresponding to a region of the second image set, to be synthesized with the first image set.

In addition, the second storage 150 may store positional information of an entire image corresponding to a region of the second mage, to be synthesized with the first image set.

Upon reading data of the region of the second image set, to be synthesized with the first image set, from the storage 120, the image processor 130 may read the positional information stored in the second storage 150 and request data to the storage 120 based on the positional information.

The image processor 130 may request image data in units of the positional information to the storage 120.

In detail, the image processor 130 may request data about a pixel contained in the region 201 of the second image set, synthesized with the first image set, as well as data of pixels contained in the region 201 of the second image set, synthesized with the first image set, in a unit for storing positional information, to the storage 120.

For example, the horizontal line 207 contains the region 201 in which the second image set is synthesized with the first image set and a region in which the second image set is not synthesized with the first image set. However, the two regions are contained in one unit of the horizontal line 207. Accordingly, the image processor 130 may request and receive data of pixels that are not contained in the region 201 of the second image set, synthesized with the first image set, as well as data of pixels of the region 201 of the second image set, synthesized with the first image set, in one horizontal line unit, to and from the storage 120.

The receiver 110, the image processor 130, and the second storage 150 may be embodied in the form of a single chip. Accordingly, the display apparatus 100 may be embodied as a system on chip (SoC).

Figure 8A:
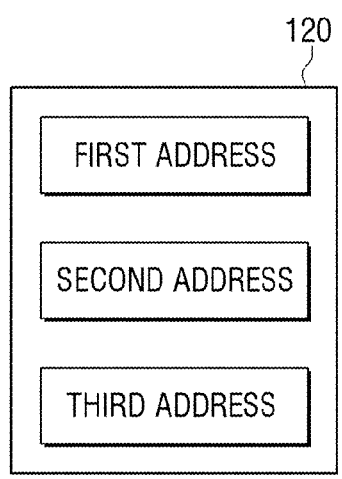
FIGS. 8A and 8B are diagrams for explaining a method for storing positional information of a second storage of FIG. 7.
Figure 8B:
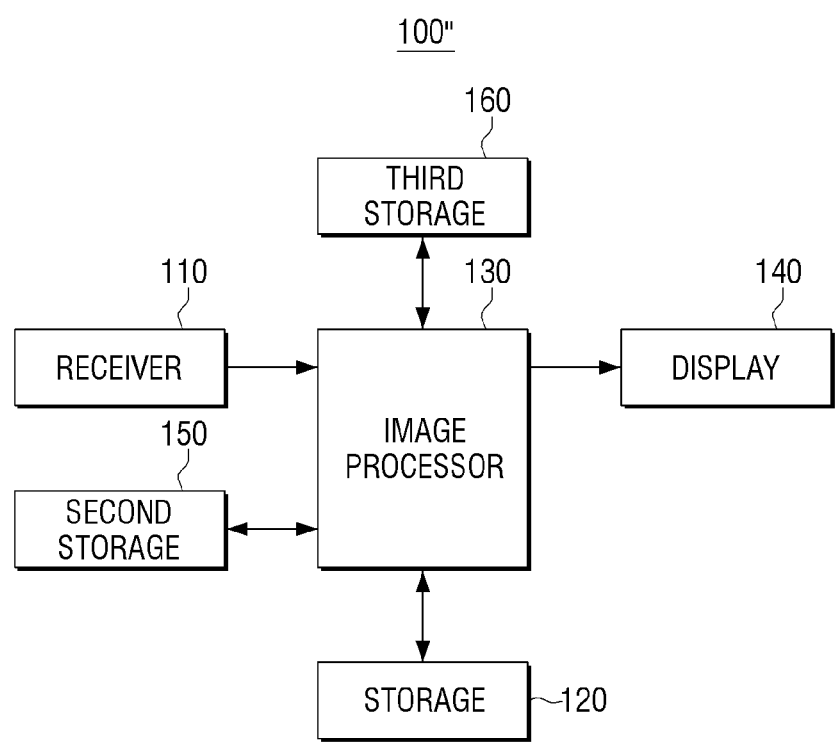

FIGS. 8A and 8B are diagrams for explaining a method for storing positional information of an address for storing a second image set according to an exemplary embodiment of the present disclosure.

The image processor 130 may store the positional information of the address for storing the second image set in the second storage 150.

Referring to FIG. 8A, the storage 120 may store a plurality of second image sets, and in this case, the respective images may be stored in storage spaces with different addresses.

In this case, the image processor 130 may store an address of a storage space for storing each image as positional information in the second storage 150.

For example, when a first image of the second image set is stored in a first address and the first image of the second image set is currently synthesized with the first image set, the first address for storing the first image of the second set may be stored as positional information in the second storage 150.

In addition, when a second image of the second image set is stored in a second address and the second image of the second image set is currently synthesized with the first image set, the second address for storing the second image of the second image set may be stored as positional information in the second storage 150.

Although the case in which two images of the second image set are stored in the storage 120 has been described with regard to the exemplary embodiment of the present disclosure, exemplary embodiments of the present disclosure are not limited thereto. That is, images of the second image set, for example, a plurality of images indicating an OSD menu, channel information, channel information, volume information, a setting menu, and so on may be stored in the storage 120.

Referring to FIG. 8B, the display apparatus 100 may further include a third storage 160 and a plurality of second image sets may be stored in different storages, that is, the storage 120 and the third storage 160, respectively.

In this case, the image processor 130 may store addresses of storages for the respective image sets, that is, the storage 120 and the third storage 160 as positional information in the second storage 150.

For example, when the first image of the second image set may be stored in the storage 120 and the first image of the second image set is currently synthesized with the first image set, an address of the storage 120 for storing the first image of the second image set may be stored as positional information in the second storage 150.

In addition, when a second image of the second image set is stored in the third storage 160 and the second image of the second image set is currently synthesized with the first image set, an address of the third storage 160 for storing the second image of the second image set may be stored as positional information in the second storage 150.

Although the case in which two images of the second image set are stored in two storages, respectively has been described with regard to the exemplary embodiment of the present disclosure, exemplary embodiments of the present disclosure are not limited thereto. That is, the number of storages for storing images of the second image set may be three or more. In addition, even if there is a plurality of storages, a plurality of images of the second image set may be stored in one storage.

Figure 9:
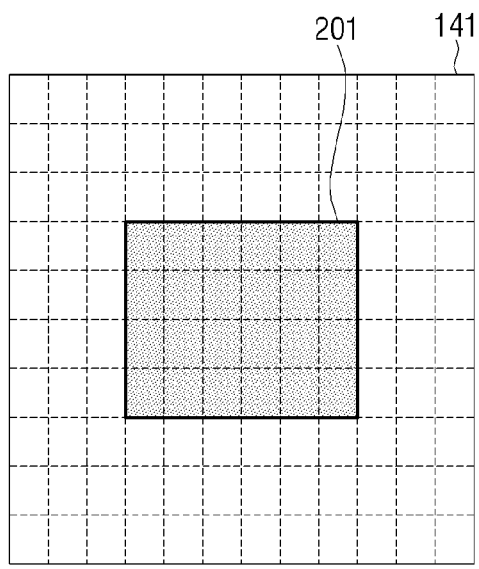
FIG. 9 is a diagram illustrating the case in which a second image set is changed according to an exemplary embodiment of the present disclosure.
Figure 9:
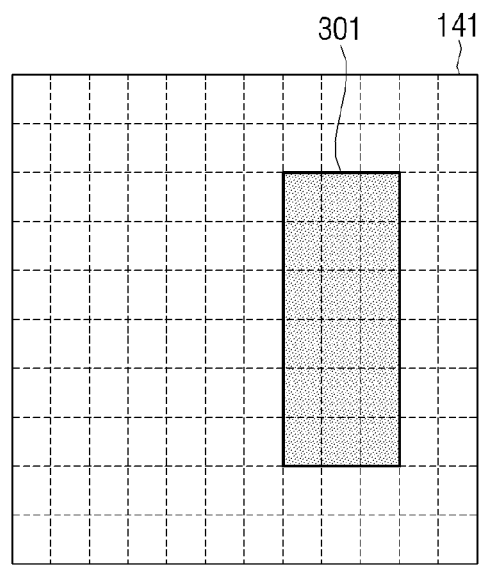

FIG. 9 is a diagram illustrating the case in which a second image set is changed according to an exemplary embodiment of the present disclosure.

As seen from FIG. 9, an image 201 of the second image set, which is applied to an image of the first image set to output a final image set, is changed to another image 301.

When a preset event occurs, the image processor 130 may determine that the image 201 of the second image set is changed to another image 301 and perform image synthesis on the changed image 301 of the second image set.

In addition, when the image of the second image set is changed, the image processor 130 may perform all processes that have been applied to a non-changed image 201, on the change image 301. Accordingly, the first image set and the changed image 301 of the second image set may be synthesized to generate a final image set and the final image set may be displayed on a monitor 141 of the display.

For example, the image processor 130 may receive the first image set and the changed image 301 of the second image set in units of frames and may synthesize the received first image set and the changed image 301 of the second image set to generate a final image set.

Upon receiving an entire portion of the changed image 301 of the second image set, the image processor 130 may detect a region of the received second image set, to be synthesized with the first image set.

The image processor 130 may receive only data of the second image set corresponding to the detected region of the changed image 301 of the second image set while a last image set of a next frame is generated.

In addition, the image processor 130 may synthesize the received data and the first image set to generate a final image set.

Figure 10:
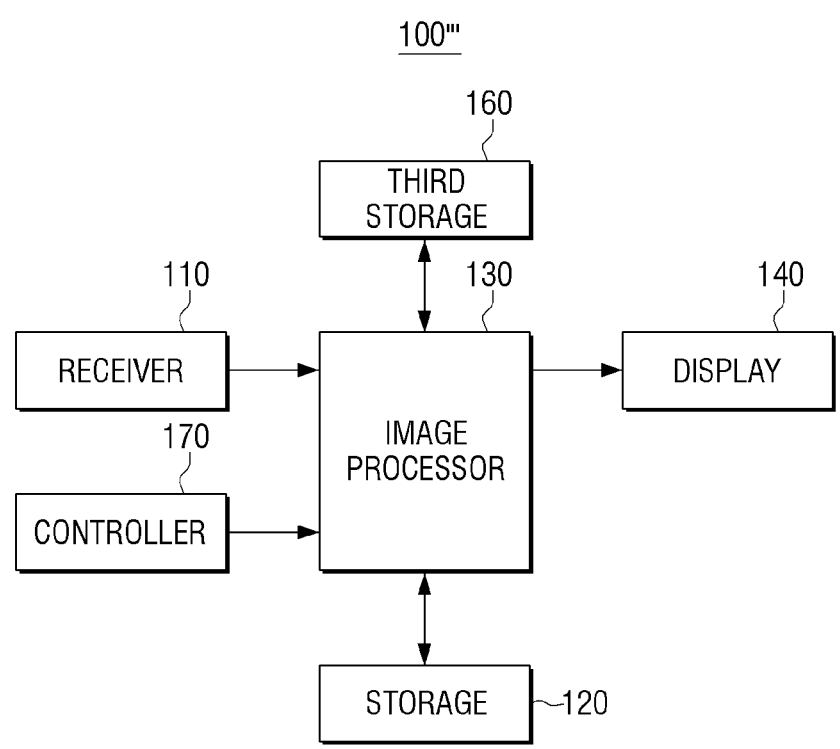
FIGS. 10 and 11 are diagrams illustrating a configuration of display apparatus according to another exemplary embodiment of the present disclosure.

FIG. 10 is a diagram illustrating a configuration of a display apparatus 100 according to an exemplary embodiment of the present disclosure.

Referring to FIG. 10, the display apparatus 100 may include a controller 170 for controlling an overall operation of the display apparatus 100.

When an event occurs, for example when there is user's manipulation or when a time period for displaying the second image set exceeds a preset time period, the controller 170 may determine that an image of the second image set is changed to another image.

In this case, the image processor 130 may receive a signal indicating that the second image set is changed to a signal, from the controller 170 to determine that the second image is changed.

In addition, the controller 170 may change a storage address for receiving an image of the second image set, and in this case, the image processor 130 may detect that the storage address of the received second image set is changed to determine that the second image set is changed.

The receiver 110, the image processor 130, the second storage 150, and the controller 170 may be embodied in form of a single chip. Accordingly, the display apparatus 100 may be embodied as a system on chip (SoC).

Figure 11:
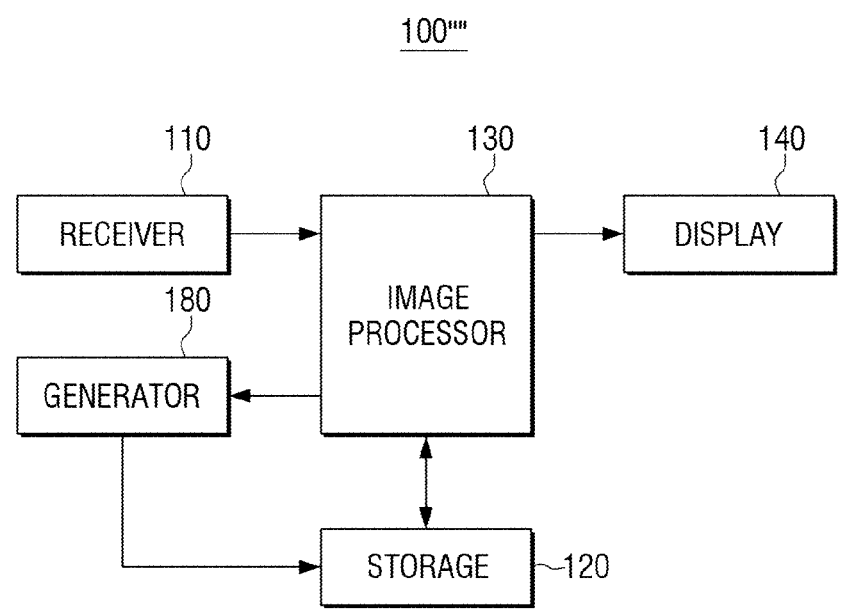

FIG. 11 is a diagram illustrating a configuration of a display apparatus 100 according to another exemplary embodiment of the present disclosure.

Referring to FIG. 11, the display apparatus 100 may include a generator 180 for generating a second image set.

When the generator 180 transmits a new second image set to a first address of the storage 120 while the second image set stored in the first address of the storage 120 is transmitted to the image processor 130 to synthesize a final image set, the image processor 130 may check the image set transmitting process to determine that an image of the second image is changed.

The receiver 110, the image processor 130, the second storage 150, the controller 170, and the generator 180 may be embodied in the form of a single chip. Accordingly, the display apparatus 100 may be embodied as a system on chip (SoC).

Figure 12:
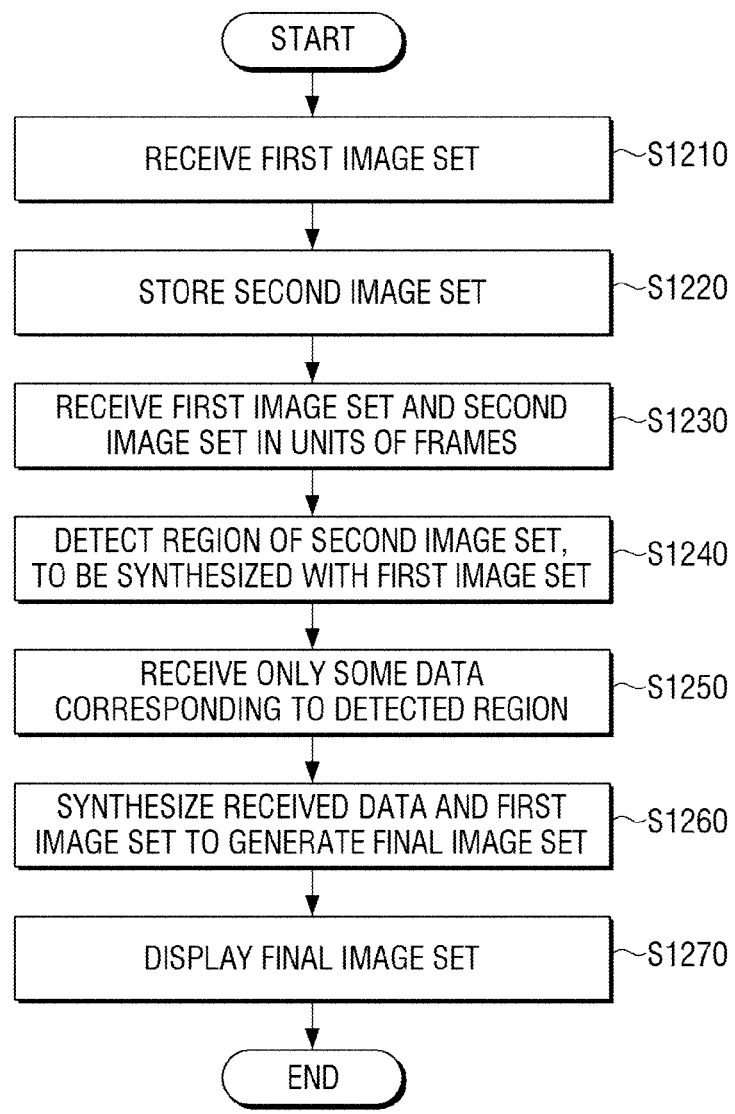
FIG. 12 is a flowchart for explanation of a display method according to an exemplary embodiment of the present disclosure.

FIG. 12 is a flowchart for explanation of a display method according to an exemplary embodiment of the present disclosure.

First, a first image set is received (S1210). In detail, a broadcast image input from an external source may be received or an image input from a user device such as a VTR or a gaming player which is connected by a user. During this process, the receiver 100 may be associated with an image relay apparatus such as a set-top box.

In addition, a second image set with a size corresponding to the first image set is stored (S1220). In detail, the second image set may be displayed to overlap with the first image set on a display and may include an OSD menu, channel information, volume information, a setting menu, and so on. The second image set may be displayed to overlap with the first image set and may have a size corresponding to the first image set. In addition, the second image set may be formed to contain a region of the second image set, which is not synthesized with the first image set, as well as a region of the second image set, synthesized with the first image set.

The first image set and the second image set are received in units of frames (S1230). In detail, the image processor 130 may receive the first image set from the receiver 110 for each frame, receive the second image set from the storage 120 to generate a final image set for each frame, and display the final image set on a display.

Upon receiving an entire portion of the second image set, a region of the received second image set, to be synthesized with the first image set, is detected (S1240). In detail, when an initial second image set is received, that is, image data corresponding to all regions of the second image set is received from the storage 120 during generation of the final image set of a first frame. Upon receiving the second image set, RGB values and α (alpha) of which are stored as a database for each pixel, the image processor 130 may check α (alpha) to check whether a corresponding pixel is synthesized with the first image set.

In addition, only some data corresponding to a detected region with respect to the second image set is received from a next frame after a region is detected (S1250). In detail, in a process for generating a final image set of the first frame, image data with respect to an entire portion of the second image set is received, but only image data with respect to a region to be synthesized with the first image set from an image of a second frame may be received.

In addition, the received data and the first image set may be synthesized to generate a last image set of a final image set (S1260). In detail, a last image set is generated using image data with respect to a region applied to the first image data and information (α (alpha)=0) about α (alpha) of a region that is not applied to the first image set.

Lastly, the generated final image set is displayed (S1270).

Accordingly, the display apparatus 100 may reduce unnecessary data transmission between the storage 120 and the image processor 130. In addition, data transmission between the storage 120 and the image processor 130 may be reduced so as to save a bandwidth and reduce power consumption.

The display method of the display apparatus according to various exemplary embodiments described above may be implemented in a program so as to be provided to the display apparatus. Particularly, the program including the display method of the display apparatus may be stored and provided in a non-transitory computer readable medium.

The non-transitory computer readable medium does not mean a medium storing data for a short period such as a register, a cash, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

The foregoing exemplary embodiments and advantages are merely exemplary and are not to be construed as limiting the present disclosure. Also, the description of the exemplary embodiments of the present disclosure is intended to be illustrative, and not to limit the scope of the claims, and many alternatives, modifications, and variations will be apparent to those skilled in the art.

What is claimed is:

1. A display apparatus comprising:
   a receiver configured to receive a first image set;
   a storage configured to store a second image set having a size corresponding to the first image set;
   an image processor configured to receive the first image set and the second image set in units of frames and to use the first image set and the second image set to generate a final image set by
      receiving an entire portion of the second image set of one frame,
      detecting a region of the second image set, to be synthesized with the first image set, by using the received entire portion,
      after detecting the region, receiving only partial data, corresponding to the detected region, of the second image set of a next frame, and
      synthesizing the received partial data and the first image set to generate a final image set; and
   a display configured to display the generated final image set.

2. The display apparatus as claimed in claim 1, wherein:
   the second image set contains transparency information about each pixel of the second image set, and
   the image processor detects the region of the second image set, to be synthesized with the first image set, using the transparency information.

3. The display apparatus as claimed in claim 1, further comprising a second storage configured to store positional information about the detected region,
   wherein the image processor receives the partial data based on the positional information stored in the second storage.

4. The display apparatus as claimed in claim 3, wherein the positional information comprises address information about an address of the partial data.

5. The display apparatus as claimed in claim 4, wherein the image processor stores the positional information about the detected region in at least one of pixel units, block units, horizontal line units, vertical line units, and entire image units in the second storage, and the partial data is stored in the storage.

6. The display apparatus as claimed in claim 1, wherein the second image set is an on-screen display (OSD) image.

7. The display apparatus as claimed in claim 1, wherein the receiver and the image processor are implemented in a single chip as components of a system on chip (SoC).

8. A display method comprising:
   receiving a first image set and a second image set, having a size corresponding to the first image set, in units of frames;
   in response to receiving an entire portion of the second image set of one frame, detecting a region of the second image set, to be synthesized with the first image set, by using the received entire portion;

after the detecting the region, receiving only partial data, corresponding to the detected region, of the second image set of a next frame;

synthesizing, by a hardware processor, the received partial data and the first image set to generate a final image set; and displaying the generated final image set.

9. The display method as claimed in claim 8, wherein the second image set contains transparency information about each pixel of the second image set, and the detecting comprises detecting the region of the second image set, to be synthesized with the first image set, using the transparency information.

10. The display method as claimed in claim 8, further comprising storing positional information about the detected region, wherein the receiving the partial data is based on the stored positional information.

11. The display method as claimed in claim 10, wherein the positional information comprises address information about the partial data.

12. The display method as claimed in claim 11, wherein the storing of the positional information comprises storing the positional information about the detected region in at least one of pixel units, block units, horizontal line units, vertical line units, and entire image units, and the receiving of the partial data comprises receiving the partial data in a third storage.

13. The display method as claimed in claim 8, wherein the second image set is an on-screen display (OSD) image.

14. A non-transitory computer readable medium storing a program that, when executed by at least one hardware processor of a display apparatus, causes execution of a display method comprising receiving a first image set and a second image set, having a size corresponding to the first image set, in units of frames;

in response to receiving an entire portion of the second image set of one frame, detecting a region of the second image set, to be synthesized with the first image set, by using the received entire portion;

after the detecting the region, receiving only partial data, corresponding to the detected region, of the second image set of a next frame;

synthesizing, by a hardware processor, the received partial data and the first image set to generate a final image set; and displaying the generated final image set.

* * * * *